United States Patent [19]

Faruque

[11] Patent Number: 5,734,983
[45] Date of Patent: Mar. 31, 1998

[54] FREQUENCY ASSIGNMENT IN A CELLULAR RADIO SYSTEM

[75] Inventor: Saleh Faruque, Plano, Tex.

[73] Assignee: Northern Telecom Limited, Richardson, Tex.

[21] Appl. No.: 667,208

[22] Filed: Jun. 20, 1996

[51] Int. Cl.⁶ .................................................. H04Q 7/20
[52] U.S. Cl. .......................... 455/450; 455/446; 455/447; 455/449
[58] Field of Search ............................. 455/62, 63, 67.1, 455/67.3, 103, 422, 429, 443, 444, 446, 447, 449, 450, 464, 500, 507

[56] References Cited

U.S. PATENT DOCUMENTS

| | | | |
|---|---|---|---|
| 5,073,971 | 12/1991 | Schaeffer | 455/447 |
| 5,111,534 | 5/1992 | Benner . | |
| 5,233,643 | 8/1993 | Naeini et al. . | |
| 5,247,699 | 9/1993 | Hartman | 455/447 |
| 5,365,571 | 11/1994 | Rha et al. | 455/446 |

OTHER PUBLICATIONS

Michel Mouly, *Regular Cellular Reuse Patterns*, Jul. 1991, IEEE, pp. 681–688.

Primary Examiner—Edward F. Urban
Assistant Examiner—Gertrude Arthur
Attorney, Agent, or Firm—Kenneth W. Bolvin

[57] ABSTRACT

The N=4 frequency layout plan of the present invention is based on dividing up the available frequencies into 12 or a multiple of 12 frequency groups. These groups are then distributed evenly and alternately among four tri-cell groups. Each tri-cell group is comprised of three identical cells that are driven by a single source located in the center of the tri-cell group. In the preferred embodiment, the frequency distribution is a horizontal distribution of first the odd frequencies then the even frequencies so that there are no adjacent channels.

23 Claims, 3 Drawing Sheets

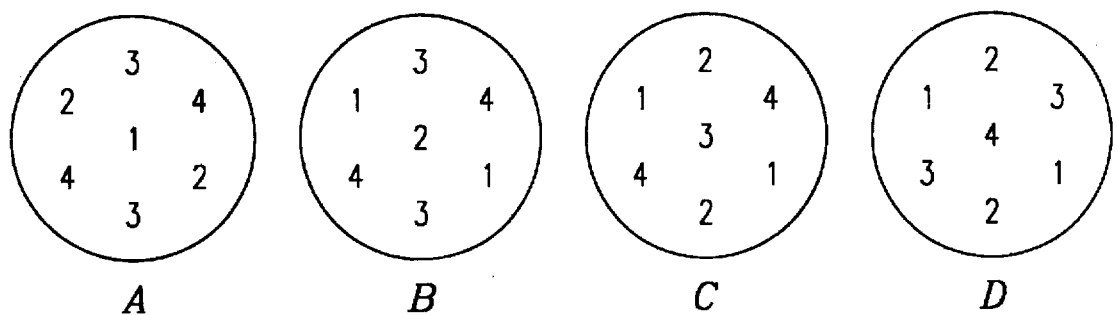
FIG. 5
FIG. 6
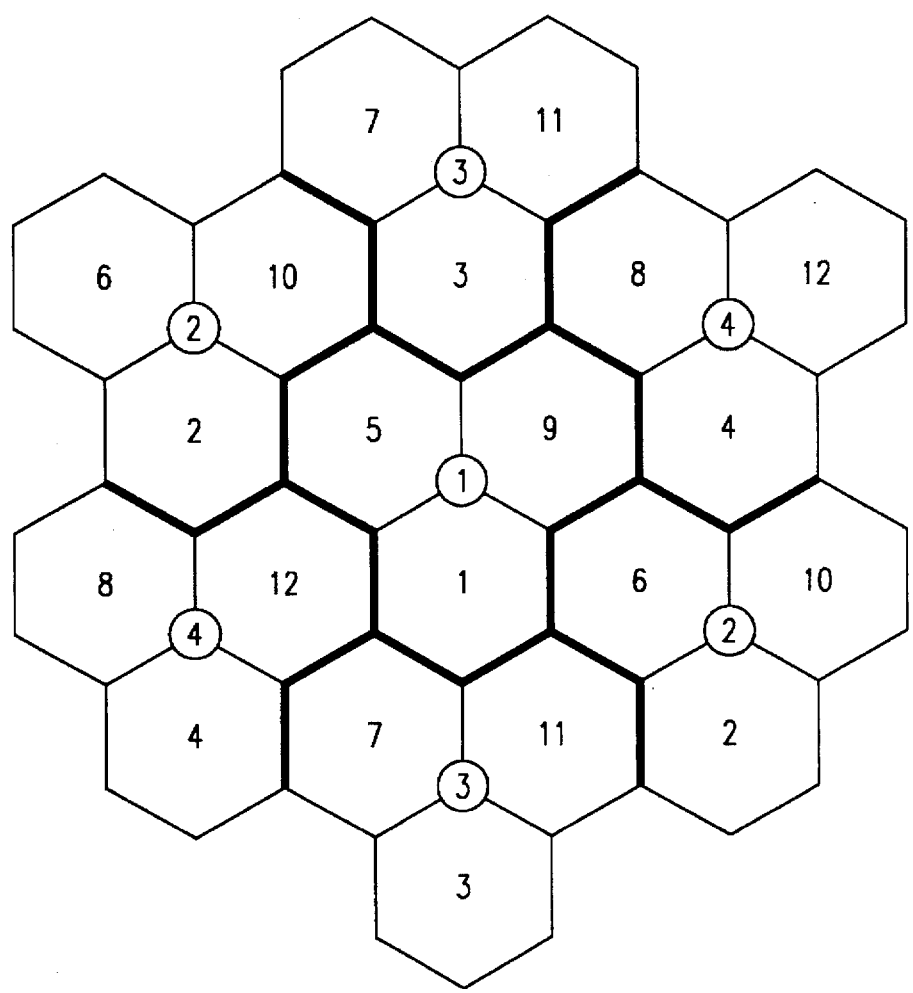

FREQUENCY ASSIGNMENT IN A CELLULAR RADIO SYSTEM

BACKGROUND OF THE INVENTION

I. Field of the Invention

The present invention relates to radio communications. More particularly, the present invention relates to cellular radiotelephone communications.

II. Description of the Related Art

Cellular radiotelephone systems enable mobile subscribers to communicate with land-line telephone networks while moving through a geographical area. High density, high capacity cells in typical cellular radiotelephone systems are made up of six directional antennas centrally located in the cell. Each antenna radiates into a 60° sector of the cell. A number of these cells are combined to form the cellular radiotelephone system.

The cell shapes are determined by both the radiation pattern of the antennas and the local conditions at the cell site. Cells, however, are typically idealized as hexagonal patterns since such a pattern closely approximates the ideal antenna radiation pattern.

Cellular radiotelephone systems use different channel frequencies for each mobile subscriber. The transmission from the mobile to the cell uses one frequency while the transmission from the cell to the mobile user uses another frequency. These two frequencies are not used by other nearby mobiles as this would lead to interference on the channel and a reduction in signal quality. This interference is referred to in the art as co-channel interference.

Another type of interference experienced by cellular radiotelephone users is adjacent channel interference. This interference is due to the energy slipover between adjacent channels.

Both types of interference affect the signal quality, referred to as the carrier to interference ratio (C/I). This ratio is the signal strength of the received desired carrier to the signal strength of the received interfering carriers. A number of physical factors can also affect C/I in cellular systems: buildings, geography, antenna radiation patterns, mobile traffic transmitting power, and mobile traffic location within the cell.

Due to the low power of the cell's transmitters, the same frequencies can be reused in other cells, referred to as co-channel cells, in the same geographical area. Greater frequency reuse allows more mobile traffic to use the cellular system. There are, however, constraints on the location of the co-channel cells. Even though the transmitters are typically low power, placing co-channel cells too close may cause interference.

Frequency planning is a method for optimizing spectrum usage, enhancing channel capacity, and reducing interference. Frequency planning involves channel numbering, channel grouping into subsets, and assigning particular channels to particular cells. The principal objective of this planning is to ensure adequate channel isolation to reduce channel interference while maintaining a high channel capacity.

A prior art method of symmetrical frequency planning begins with two integers, i and j, that are referred to as shift parameters. The frequency plan is established by starting with a reference cell and moving over i cells along the chain of cells. After reaching the $i^{th}$ cell, a counter-clockwise turn of 60° is made and another move of j cells is made. The $j^{th}$ cell can safely be a co-channel cell. The frequency plan can also be established by moving j cells before turning i cells or by turning 60° clockwise.

After all the possible co-channel cells of the initial cell are laid out, another reference cell is chosen and the procedure is repeated. this entire procedure is repeated as often as necessary to establish the frequency plan of the entire metropolitan cellular system.

The cells thus established by the above procedure form a reuse pattern of $i^2+ij+j^2$ cells. The number of cells in this reuse pattern is a predominant concern of the cellular industry since this number determines how many different channel groups can be formed out of the frequency spectrum allocated to cellular radiotelephones. A low number of cells in a reuse pattern means more channel groups can be formed and more users accommodated.

Another method for determining frequency reuse is illustrated in U.S. Pat. No. 5,483,667 to Faruque and assigned to Northern Telecom Limited and incorporated herein by reference. This patent teaches an N=3 frequency plan using 60° sectors and divides the channels into 18 frequency groups. This provides 395/18=22 voice channels per sector or 22×6= 132 voice channels per cell with a reuse distance of D/R= $\sqrt{3N}=\sqrt{3 \cdot 3}=3$.

In the Advanced Mobile Phone System (AMPS) used in North America, 416 frequencies are available for cellular use. These 416 frequencies must be divided among the cells and reused as necessary to provide coverage to a metropolitan or other geographical area. Additionally, 21 of these channel frequencies must be used as control frequencies to establish calls between users and cells. This further reduces the number of channels to 395 for use as voice channels. There is still a need for even greater frequency reuse to expand the capacity of the cellular system without performance degradation.

SUMMARY OF THE INVENTION

The present invention encompasses a process for frequency allocation in a cellular radio system. The process starts by creating a quantity of tri-cell groups from three cells. Four of the tri-cell groups are then formed into a cellular cluster.

The available frequencies are grouped into a predetermined number of frequency groups. In the preferred embodiment, the frequencies are grouped into 12 frequency groups, numbered 1–12.

An antenna array comprised of directional antennas is positioned relatively close to the center of each tri-cell group. Since the idealized form of a cell is a hexagon, the antennas are positioned at the point where all three cells meet. Each antenna radiates into a predetermined sector of the tri-cell group. In the preferred embodiment, the sector is a 120° radiation pattern.

The frequency groups are horizontally allocated to the predetermined sectors such that each horizontally adjacent predetermined group of frequencies is odd numbered to a predetermined point and then even numbered from that predetermined point to the end of the cluster. Other embodiments of the process of the present invention allocates the frequency groups in a vertical manner.

BRIEF DESCRIPTION OF THE DRAWINGS

FIG. 5 shows an alternate embodiment tri-cell frequency plan using a cyclical distribution of frequencies.

FIG. 6 shows an example of the embodiment of FIG. 5.

DETAILED DESCRIPTION OF THE PREFERRED EMBODIMENT

Figure 1:
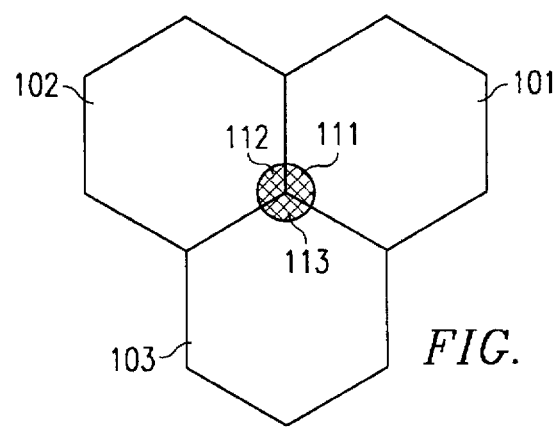
FIG. 1 shows a tri-cell group with central antenna.

The frequency allocation plan of the present invention provides greater frequency reuse in a cellular radiotelephone system. The frequency allocation plan is based on a group of three identical cells (101–103), driven from the center of the tri-cell group. This concept is illustrated in FIG. 1.

The tri-cell group is comprised of the three cells (101–103) and the directional antennas (111–113) in the center of the group. Each antenna (111–113) radiates into a 120° sector of the group. In this case, the 120° sector covers the entire cell (101–103). Since the hexagons are only an ideal representation of the cell structure, the antennas may not be implemented exactly in the center of the group but offset somewhat due to geography, buildings, and cell requirements.

Figure 2:
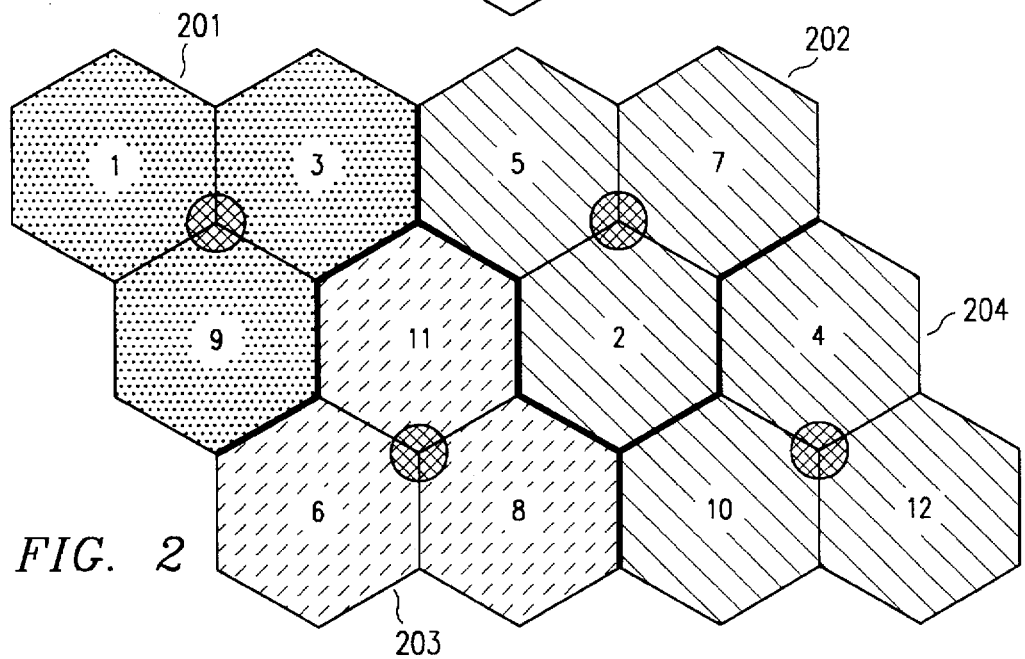
FIG. 2 shows a tri-cell cluster of four tri-cell groups with a horizontal frequency distribution.

FIG. 2 illustrates four of the tri-cell groups (201–204) arranged into a cluster for a total of 12 logical cells. All of the tri-cell groups (201–204) of the cluster are the same except for the frequency allocation.

The N=4 frequency plan of the present invention is based on dividing up the available channels into 12 frequency groups or a multiple of 12 frequency groups. These groups are then distributed evenly among the four tri-cell groups in a 4×3 array.

FIG. 2 illustrates the preferred embodiment for the frequency allocation. In this embodiment, the frequency groups, numbered 1–12, are distributed horizontally through the tri-cell cluster. In this case, the odd frequency groups are allocated to the cells through group 11. The layout starts at group 1 and increments to the next odd frequency group in the horizontally adjacent cell until the end of the 4×3 matrix is reached. Frequency group 9 starts the next row of the matrix.

The next cell after group 11 is allocated frequency group 2. The rest of the horizontally adjacent cells are allocated the next even frequency group in the same manner as the odd groups.

Figure 3:
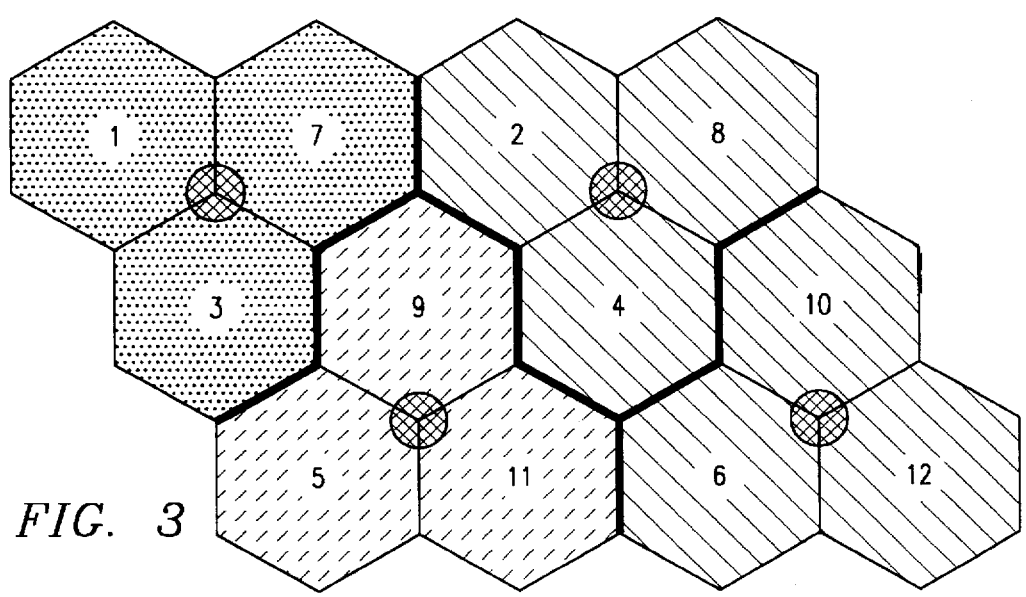
FIG. 3 shows a tri-cell cluster of four tri-cell groups with a vertical frequency distribution.

FIG. 3 illustrates an alternate embodiment that uses a vertical frequency layout. This is accomplished by allocating the next vertically adjacent cell the next odd numbered frequency group until group 11. Then the same procedure is followed for the even frequency groups.

Figure 4:
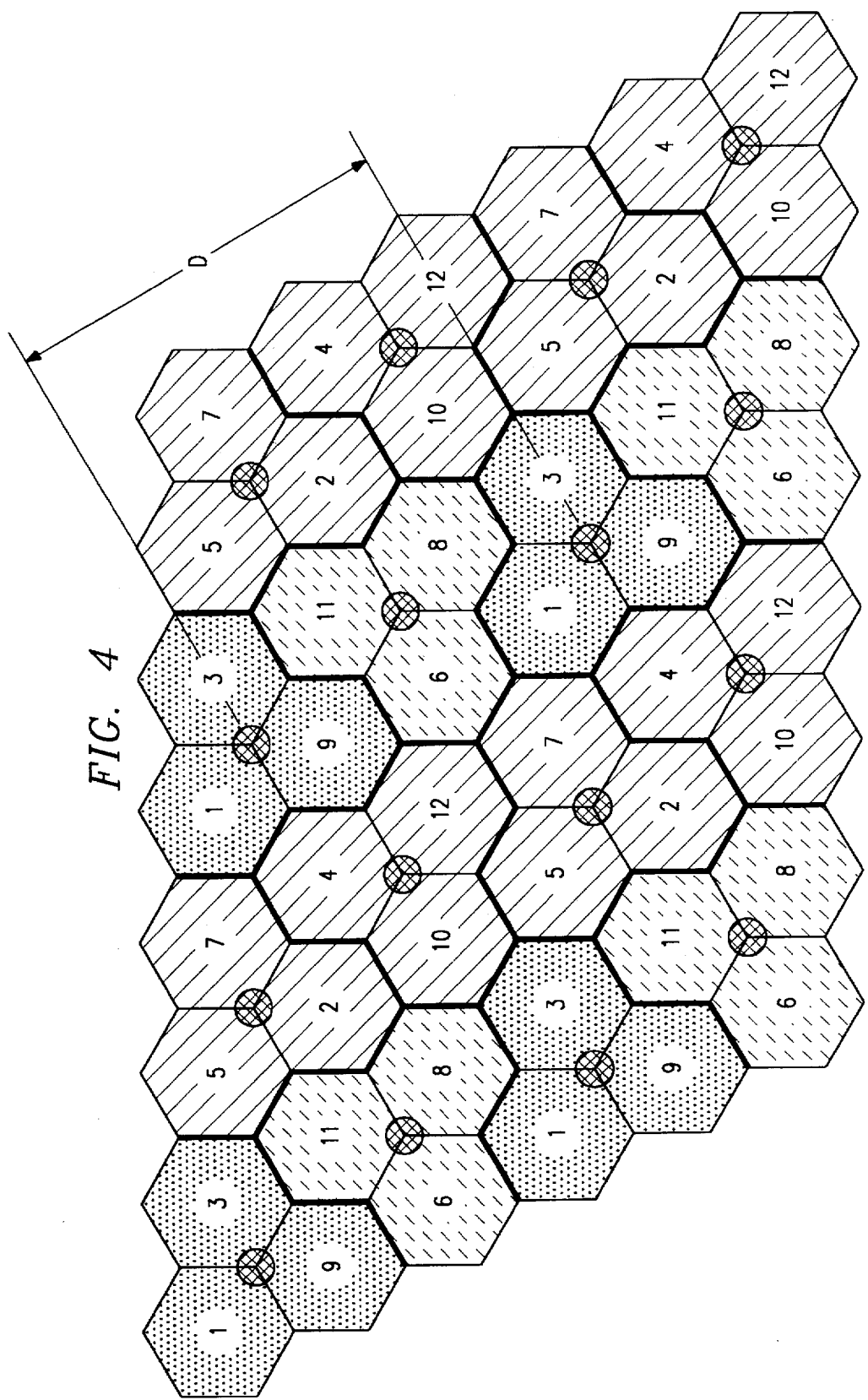
FIG. 4 shows a typical tri-cellular growth plan in accordance with the present invention.

FIG. 4 illustrates the four tri-cell clusters as used in a larger growth scheme such as would be required in a large geographical area. The same frequency layout plan is used for each of the clusters to keep a uniform frequency allocation so that there is no adjacent channel interference.

The channel capacity provided by the N=4 frequency layout plan of the present invention is determined by subtracting the number of control channels used in the preferred embodiment, 21, from the total number of available frequencies, 333. This number is then divided by the number of frequency groups. In the present case, the frequency layout plan provides (416−21)/12=33 channels per sector or 3×33=99 channels per tri-cell group.

The standard Grade of Service (GOS) for AMPS is 2% and is well known in the art. This means that it is acceptable for 2% of the calls in a cellular service provider's area to be blocked by some means such as buildings, terrain, etc. Using this GOS, the present invention provides 24.6 erlang per sector or 3×24.6=73.8 erlang per tri-cell group, as determined from the standard cellular traffic table that is well known in the art. This is an improvement of more than 30% over the prior art.

Since the cells of the present invention are excited from the corner, 120° apart, the antenna configuration and its directivity play an important role in determining system performance, such as distance between co-channels, co-channel interference, and adjacent channel interference. The repeat distance between co-channels is determined by the equation $D/R=\sqrt{3N}$. Since, in the frequency lay out of the present invention, N=4, $D/R=\sqrt{3 \cdot 4}=\sqrt{12}=3.46$.

With a typical antenna front to back ratio, the C/I prediction equation, well known in the art, becomes:

$$C/I = 10\log[\{\sqrt{3N}\}^\gamma] + \Delta dB|_{Side\ to\ Side}$$

where N=4, ΔdB is due to the antenna side-to-side ratio (>10 dB for typical sector antennas), and γ is the pathloss slope, also referred to in the art as the propagation constant. The pathloss slope is the rate of decay of signal strength as a function of distance.

The co-channel interference (CCI) and adjacent channel interference (ACI) of the present invention can be further reduced in alternate embodiments by using high gain antennas that have a larger front-to-back ratio.

In the above embodiments, the odd frequencies are laid out first. Alternate embodiments lay out the even frequencies first then the odd.

An alternate N=4 frequency layout plan is illustrated in FIG. 5. This plan uses a cyclic allocation instead of a horizontal or vertical allocation. Each of the numbers illustrated in FIG. 5 represents a tri-cell group. As in the preferred embodiment, each tri-cell group has three associated frequency groups.

Also as in the preferred embodiment, the available frequencies are divided up into 12 frequency groups, a tri-cell group is formed from three cells, and the tri-cell groups are formed into cellular clusters. Each cluster has 12 logical cells with antennas that radiate into the same 120° sectors as the preferred embodiments. The four tri-cell cluster, however, is formed by one tri-cell group in the center of the circle while the other three groups of the cluster are in a half circle around the middle group. These same three groups are repeated in a half circle on the other side of the circle. This results in the middle tri-cell group forming two tri-cell clusters.

Referring to FIG. 5, circle A assumes the tri-cell group 1 is in the center while the other three groups circle group 1. Circle B assumes group 2 as the middle. Circle C assumes group 3 as the middle and Circle D has group 4 in the middle. FIG. 5 illustrates one cyclical principle.

FIG. 6 illustrates an example of the principle of FIG. 5. As seen in FIG. 6, tri-cell group 1 is assumed to be the center while the other groups encircle group 1, as in circle A of FIG. 5. This layout repeats as needed to provide cellular service to a geographical region.

FIG. 6 also shows the other layouts illustrated in FIG. 5. For example, by assuming tri-cell group 4 of FIG. 6 is the center, circle D of FIG. 5 is also shown in FIG. 6.

In the cyclic channel distribution illustrated in FIGS. 5 and 6, the channel distribution is based on C, C+4, C+8 where C=1, 2, 3, 4, C being the cell number. Using this scheme, cell 1 is allocated frequency groups 1, 5, and 9. Cell 2 is allocated frequency groups 2, 6, and 10. Cell 3 is allocated frequency groups 3, 7, and 11. Cell 4 is allocated frequency groups 4, 8, and 12.

The principles of the cyclic allocation can be applied to obtain a growth plan while retaining the adjacent channel isolation through a network of any size. This scheme has the same ratio, CCI, and ACI as determined in the preferred embodiment above.

In summary, the N=4 frequency allocation plan of the present invention provides greater frequency reuse thereby increasing user capacity. Additionally, the present invention enjoys greater trunking efficiency, reduced hardware and software complexities, and reduced cost in comparison to the prior art.

I claim:

1. A method for frequency allocation in a cellular system, the cellular system comprising a plurality of cells, the method comprising the steps of:

forming a tri-cell group from three of the plurality of cells;

creating three sectors in each tri-cell group such that each cell of the tri-cell group is a sector;

forming a tri-cell cluster from four of the tri-cell groups;

grouping available frequencies into a predetermined number of frequency groups comprising odd numbered frequency groups and even numbered frequency groups;

locating a plurality of antennas substantially in the center of each tri-cell group; and horizontally allocating each of the frequency groups, in a sequential fashion, to a different sector of the twelve sectors such that each horizontally adjacent frequency group is odd numbered until the odd numbered frequency groups are exhausted and then even numbered from that point to the end of the cluster.

2. The method of claim 1 and further including repeating the tri-cell cluster as needed to cover a geographical region.

3. The method of claim 2 wherein a distance to cell radius ratio between a first use of a first frequency group of the predetermined number of frequency groups and a reuse of the first frequency group is equal to 3.46.

4. The method of claim 1 wherein the predetermined number of frequency groups is equal to 12.

5. The method of claim 1 wherein the predetermined number of frequency groups is a multiple of 12.

6. A method for frequency allocation in a cellular system, the cellular system comprising a plurality of cells, the method comprising the steps of:

forming a tri-cell group from three of the plurality of cells;

creating three sectors in each tri-cell group such that each cell of the tri-cell group is a sector;

forming a tri-cell cluster from four of the tri-cell groups;

grouping available frequencies into a predetermined number of frequency groups comprising odd numbered frequency groups and even numbered frequency groups;

locating a plurality of antennas substantially in the center of each tri-cell group; and vertically allocating each of the frequency groups, in a sequential fashion, to a different sector of the twelve sectors such that each vertically adjacent frequency group is even numbered until the even numbered frequency groups are exhausted and then odd numbered from that point to the end of the cluster.

7. The method of claim 6 and further including the step of repeating the cellular cluster as needed to cover a geographical region.

8. The method of claim 7 wherein a distance to cell radius ratio between a first use of a first frequency group and a reuse of the first frequency group is equal to 3.46.

9. The method of claim 6 wherein the predetermined number of frequency groups is equal to 12.

10. The method of claim 6 wherein the predetermined number of frequency groups is a multiple of 12.

11. A method of frequency allocation in a cellular system, the cellular system comprising a plurality of cells, the method comprising the steps of:

forming a plurality of tri-cell groups, each tri-cell group comprising three of the plurality of cells;

forming a plurality of tri-cell clusters, each tri-cell cluster comprising four of the tri-cell groups;

grouping available frequencies into multiples of 12 frequency groups; locating a plurality of antennas in a location that is substantially central in each of the plurality of tri-cell groups, each antenna radiating a 120° pattern such that each antenna radiation pattern substantially covers a different cell of the tri-cell group; and assigning a frequency group of the multiple of 12 frequency groups to each antenna such that the tri-cell cluster forms a 4 by 3 frequency group matrix where each horizontally adjacent frequency group is an odd numbered group until a predetermined maximum odd number frequency group is assigned at which point each horizontally adjacent frequency group is an even number frequency group until a predetermined maximum even number frequency group is assigned.

12. A cellular communication system for the efficient reuse of a plurality of frequency groups, the frequency groups being divided into odd and even number frequency groups, the system comprising:

a plurality of cells that are grouped into tri-cell groups comprising three of the plurality of cells, the tri-cell groups being further grouped into cellular clusters comprising four tri-cell groups;

a plurality of directional antennas located substantially in the center of each tri-cell group, each antenna oriented such that it radiates into a different cell of the tri-cell group; and a plurality of transceivers that operate on the plurality of frequency groups, at least one transceiver coupled to each antenna, the frequency groups being sequentially allocated to the cells such that the odd number frequency groups are horizontally adjacent to each other until a maximum odd number frequency group is allocated at which point even number frequency groups are horizontally adjacent to each other.

13. The system of claim 12 wherein the directional antennas radiate into 120° sectors.

14. A cellular communication system for the efficient reuse of a plurality of frequency groups, the frequency groups being divided into odd and even number frequency groups, the system comprising:

a plurality of cells that are grouped into tri-cell groups comprising three of the plurality of cells, the tri-cell groups being further grouped into cellular clusters comprising four tri-cell groups;

a plurality of directional antennas located substantially in the center of a tri-cell group, each antenna oriented such that it radiates into a different cell of the tri-cell group; and a plurality of transceivers that operate on the plurality of frequency groups, at least one transceiver coupled to each antenna, the frequency groups being sequentially allocated to the cells such that the odd number frequency groups are vertically adjacent to each other until a maximum odd number frequency group is allocated at which point even number frequency groups are vertically adjacent to each other.

15. The system of claim 14 wherein each of the directional antennas radiates into a 120° sector.

16. A method for frequency allocation in a cellular system, the cellular system comprising a plurality of cells, the method comprising the steps of:

forming a plurality of tri-cell groups, each tri-cell group being assigned a representative number and comprising three cells of the plurality of cells;

grouping available frequencies into a predetermined number of frequency groups;

locating a plurality of antennas substantially in the center of each tri-cell group, each antenna of the plurality of antennas radiating into a predetermined sector of the tri-cell group;

allocating a frequency group to each sector of the tri-cell group; and cyclically distributing the plurality of tri-cell groups around a first tri-cell group of the plurality of tri-cell groups, the cyclical tri-cell groups having a layout pattern on one half of a circle that is repeated, in order, around the other half of the circle.

17. The method of claim 16 wherein the first tri-cell group in the center of the cyclical pattern is 1 and the cyclical tri-cell group layout pattern around 1 is, in order, 2, 3, 4 on the first half of the circle and continuing in order around the circle as 2, 3, 4.

18. The method of claim 16 wherein the first tri-cell group in the center of the cyclical pattern is 2 and the cyclical tri-cell group layout pattern around 2 is, in order, 1, 3, 4 on the first half of the circle and continuing in order around the circle as 1, 3, 4.

19. The method of claim 16 wherein the first tri-cell group in the center of the cyclical pattern is 3 and the cyclical tri-cell group layout pattern around 3 is, in order, 1, 2, 4 on the first half of the circle and continuing in order around the circle as 1, 2, 4.

20. The method of claim 16 wherein the first tri-cell group in the center of the cyclical pattern is 4 and the cyclical tri-cell group layout pattern around 4 is, in order, 1, 2, 3 on the first half of the circle and continuing in order around the circle as 1, 2, 3.

21. The method of claim 16 and further including the step of allocating the predetermined number of frequency groups to each tri-cell group such that C, C+4, and C+8 are assigned to each tri-cell group, where C is the representative number of the tri-cell group.

22. The method of claim 16 wherein the predetermined number of frequency groups is 12.

23. The method of claim 21 wherein the tri-cell groups have representative numbers 1–4, cell 1 being assigned frequency groups 1, 5, and 9, cell 2 being assigned frequency groups 2, 6, and 10, cell 3 being assigned frequency groups 3, 7, and 11, and cell 4 being assigned frequency groups 4, 8, and 12.

* * * * *